United States Patent [19]
Wu

[11] Patent Number: 5,331,331
[45] Date of Patent: Jul. 19, 1994

[54] ELECTROMAGNETIC PROPAGATION TOOL USING DIPOLE ANTENNAS

[75] Inventor: Jian-qun Wu, Meriden, Conn.

[73] Assignee: Baker Hughes Incorporated, Houston, Tex.

[21] Appl. No.: 897,372

[22] Filed: Jun. 11, 1992

[51] Int. Cl.⁵ .............................. H01Q 1/04
[52] U.S. Cl. ........................ 343/719; 343/867; 324/333
[58] Field of Search ............ 343/719, 709, 866, 867, 343/873, 842, 728, 726, 742; 324/333, 346; 367/13; H01Q 1/04

[56] References Cited

U.S. PATENT DOCUMENTS 4,670,717  6/1987  Sender .................... 343/719
4,704,581  11/1987  Clark ...................... 324/341
5,001,675  3/1991  Woodward ............... 367/13

FOREIGN PATENT DOCUMENTS

0314573  10/1988  European Pat. Off.

Primary Examiner—Donald Hajec
Assistant Examiner—Hoanganh Le
Attorney, Agent, or Firm—Fishman, Dionne and Cantor

[57] ABSTRACT

An electromagnetic propagation tool using magnetic dipole antennas comprising small current loops having characteristics of a point dipole is presented. The electromagnetic tool comprises a drill collar segment having at least one dipole antenna for each transmitter and receiver antenna. The dipole antennas are disposed within pockets formed in the drill collar segment.

49 Claims, 6 Drawing Sheets

ELECTROMAGNETIC PROPAGATION TOOL USING DIPOLE ANTENNAS

BACKGROUND OF THE INVENTION

This invention relates generally to borehole formation evaluation instrumentation. More particularly, this invention relates to electromagnetic propagation tools using small loop magnetic dipole antennas for use primarily in oil and gas well drilling applications.

Borehole formation evaluation tools are known which measure phase and/or amplitude of electromagnetic waves to determine an electrical property (such as resistivity or permitivity) of a section of a borehole. Typically, the existing tools used for this application are composed of one or more transmitting antennas spaced from one or more pairs of receiving antennas. An electromagnetic wave is propagated from the transmitting antenna into the formation surrounding the borehole and is detected as it passes by the receiving antennas. In a resistivity measuring tool, magnetic dipole antennas are employed which operate in the mf and lower hf spectrum. In contrast, permitivity tools utilize magnetic dipole antennas in the VHF or UHF ranges.

In a known resistivity sensor of the type hereinabove discussed, the resistivity sensor measures both phase difference and amplitude ratio to provide two resistivities with different depths of investigation. A signal received in a first receiving antenna is shifted in phase and its amplitude will be less than the signal received in a second receiving antenna. Resistivities are then derived from both the phase difference and the amplitude ratio of the received signals. This differential measurement is primarily responsive to the formation opposite the receiving antennas and is less sensitive to the borehole and/or variations in the transmitted signal as in prior art sensing devices.

While well suited for its intended purposes the transmitter and receiver loop antennas suffer from several problems and disadvantages. These loop antennas generally comprise coils wrapped around the drill string. The coils are recessed in circumferentially cut grooves about the drill string. This is an attempt to protect the antenna coils from the harsh downhole environment encountered by measurement-while-drilling (MWD) tools. Even with the grooves these antenna coils are often damaged during the drilling process. This has been attributed to the size of the coils required for generating and detecting the electromagnetic signals (i.e., waves).

The circumferential grooves tend to structurely weaken the drill string. This has two affects, firstly, the number of loop antennas in a tool is restricted by the weakening of the tool and secondly, any attempts to employ smaller diameter tools is restricted due to the depth of the circumferential grooves.

SUMMARY OF THE INVENTION

The above discussed and other problems and deficiencies of the prior art are overcome or alleviated by the electromagnetic propagation tool using magnetic dipole antennas comprising small current loops of the present invention. In accordance with the present invention at least one magnetic dipole antenna is employed for each transmitter and receiver antenna of the electromagnetic propagation tool (e.g., a resistivity or permitivity tool). The magnetic dipoles are preferably aligned parallel to the centerline of the tool. Each dipole antenna has the characteristics of a point dipole. A pocket cutting is cut for each dipole antenna.

The small loop dipole antennas replace the larger loop antennas employed by the prior art electromagnetic propagation tools. The pocket cuttings are much smaller than the groove cuttings of the prior art (i.e., the large coil antennas). Therefore, the electromagnetic propagation tool of the present invention is mechanically stronger than the prior art tools. Further, the electromagnetic propagation tool of the present invention can be constructed to have a smaller diameter than was structurely possible with the prior art tools.

In the preferred embodiment, three small loop dipole antennas circumferentially distributed about the tool are employed for each transmitter and receiver antenna. The three dipole antenna embodiment has been shown analytically to perform at least as well as the prior art circumferentially mounted loop antenna tools, while still providing the above described advantages. A further advantage of the three dipole antenna embodiment is its capability of providing information on azimuthal variations in formation properties or tool eccentricity. The prior art circumferentially mounted loop antenna tools are not capable of providing such information. The present invention is also applicable to compensated formation measurements.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
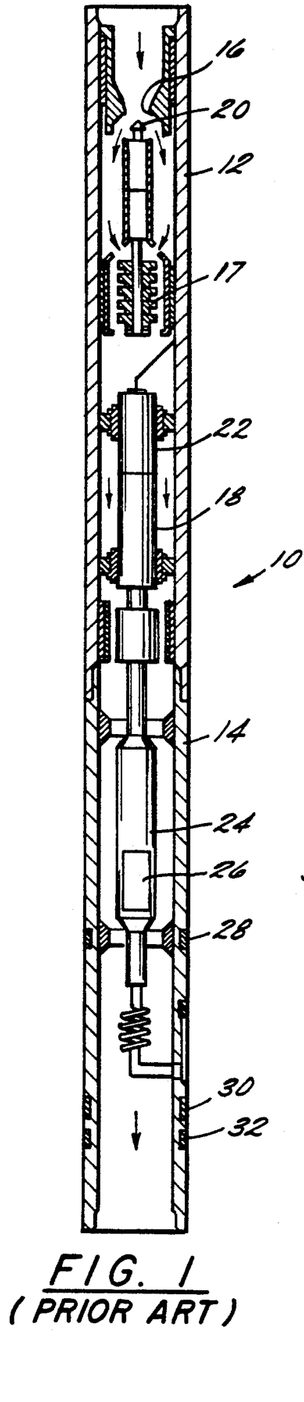
FIG. 1 is a longitudinal view through an electromagnetic tool having circumferentially mounted loop antennas in accordance with the prior art.

Referring first to prior art FIG. 1, an electromagnetic propagation resistivity tool is shown generally at 10. Tool 10 comprises a pair of drill collar segments 12 and 14. As is well known, drilling fluid or mud is pumped within the drill string as indicated by the arrows in FIG. 1. The mud flows through variable flow orifice 16 and is delivered to drive a first turbine 17. This first turbine 17 powers a generator which delivers electrical power to the sensors in a sensor unit 18. The output from sensor unit 18, which may be in the form of electrical, hydraulic or similar signals, operates a plunger 20 which varies the size of variable orifice 16, plunger 20 having a valve driver which may be hydraulically or electrically operated. Variations in the size of orifice 16 create pressure pulses in the mud stream which are transmitted to and sensed at the surface to provide indications of various conditions sensed by sensor unit 18. This activity is directed by a microprocessor and electronics unit 22.

Since sensors in sensor unit 18 are magnetically sensitive, the particular drill string segment 12 which houses the sensor elements must be a non-magnetic section of the drill string, preferably of stainless steel or monel.

In drill string segment 14, a known gamma ray and resistivity electronics package 24 is also housed in a non-magnetic drill string section. Below a gamma sensor 26 is located the electromagnetic propagation resistivity sensor, which comprises a transmitting loop antenna 28 which is spaced upwardly from two spaced receiving loop antennas 30 and 32. A memory port 33 communicates with the electronics for fast retrieval of stored data when the tool 10 is brought to the surface.

Figure 2:
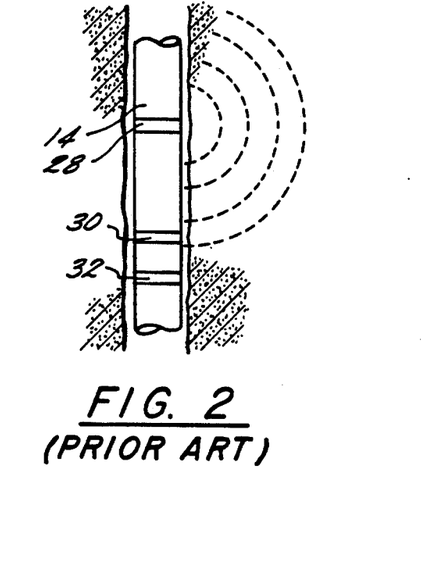
FIG. 2 is a longitudinal schematic view depicting the operation of an electromagnetic resistivity sensor of the prior art.

Referring also to prior art FIG. 2, the resistivity sensor measures both phase difference and amplitude ratio to provide two apparent resistivities with different depths of investigation. For example, in FIG. 2, a two MHz wave is propagated by transmitting antenna 28 from a transmitter in the tool into the formation and it is detected as it passes the two receivers 30 and 32. The signal at the far receiver 32 is shifted in phase and its amplitude is less than the signal on the near receiver 30. Resistivities are derived from both the phase difference and the amplitude ratio of the received signals. This differential measurement is primarily responsive to the formation opposite the receivers 30 and 32 and is less sensitive to the borehole and/or variations in the transmitted signals.

Figure 3:
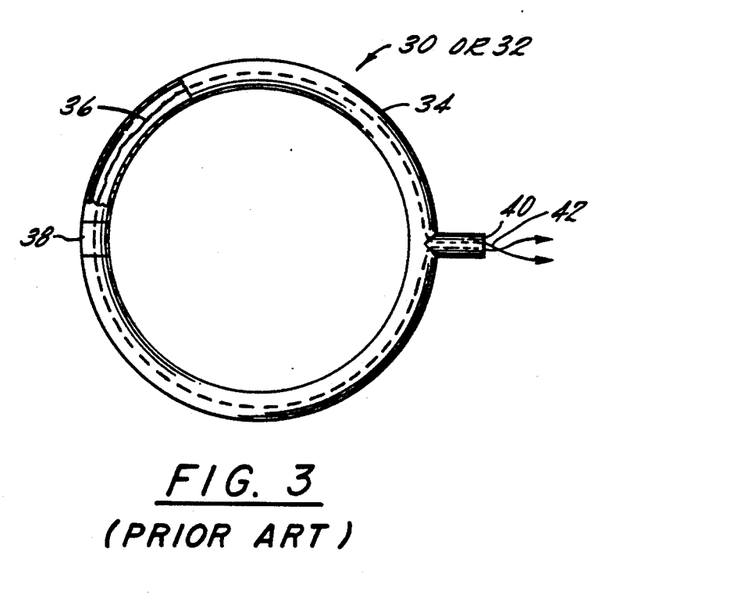
FIG. 3 is a plan view, partly broken away, of a receiving loop antenna used in accordance with prior art electromagnetic resistivity tools.

Turning now to prior art FIG. 3, a receiving loop antenna 30 or 32 in accordance with the prior art magnetic resistivity measurement instrumentation of FIG. 1 is shown. Prior art receiver 30 or 32 comprises an electrostatic shield 34 (which is preferably composed of copper) which surrounds a magnetic loop dipole antenna 36. Shield 34 includes a gap therein which is insulated using a ceramic annular plug 38. Electrostatic shield 34 also includes an exit port 40 which is located in a position opposed to insulative ceramic gap 38. Magnetic loop dipole antenna 36 exits port 40 by means of transmission line 42. In turn, transmission line 42 is connected to a radio receiver; or in some cases may be directly connected to a receiver located within the electrostatic shield 34. Alternatively, an inductive device may be used to couple the signal from loop antenna 36 to the transmission line 42 or to a radio receiver.

Figure 4:
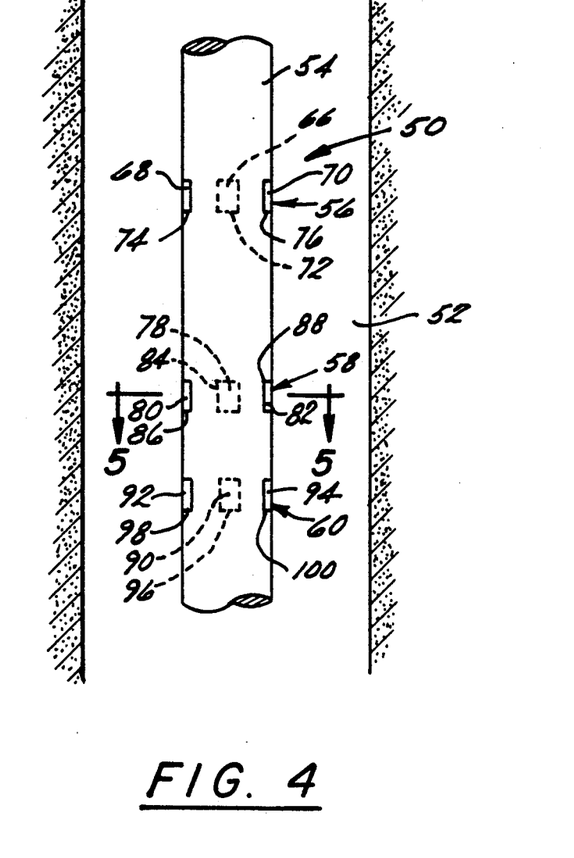
FIG. 4 is a longitudinal view of an electromagnetic propagation tool in accordance with the present invention.
Figure 5:
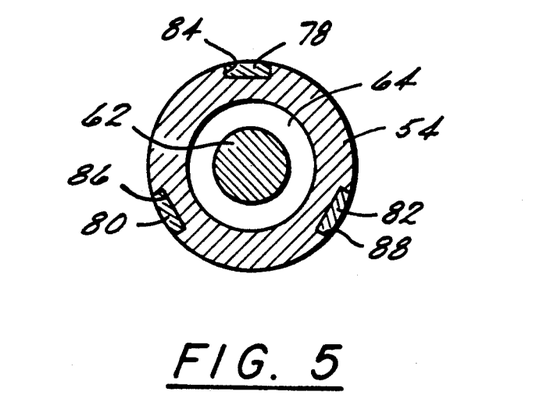
FIG. 5 is a view taken along the line 5—5 in FIG. 4.

Referring to FIGS. 4 and 5, an electromagnetic propagation resistivity tool in accordance with the present invention is shown generally at 50. Resistivity tool 50 is shown in a borehole 52. Tool 50 comprises a drill collar segment 54, a transmitting antenna assembly 56 and a pair of receiving antenna assemblies 58 and 60 spaced downwardly from assembly 56. Receiver assembly 58 is commonly referred to as the near receiver and receiver assembly 60 is commonly referred to as the far receiver. Segment 54 includes an instrument housing 62 and a passage 64. It will be appreciated that drilling mud flows through passage 64 as is well known.

In this the preferred embodiment, antenna assemblies 56, 58 and 60 are similar and each comprises three circumferentially spaced small current loop dipole antennas aligned parallel to the centerline of tool 50, wherein each dipole antenna has the characteristics of a point dipole. Assembly 56 comprises three circumferentially spaced dipole antennas 66, 68 and 70. Each dipole antenna 66, 68 and 70 is disposed in a corresponding pocket cutting 72, 74 and 76. Assembly 58 comprises three circumferentially spaced dipole antennas 78, 80 and 82. Each dipole antenna 78, 80 and 82 is disposed in a corresponding pocket cutting 84, 86 and 88. Assembly 60 comprises three circumferentially spaced dipole antennas 90, 92 and 94. Each transmitting dipole antenna 66, 68 and 70 includes means for receiving an electrical transmit signal (i.e, an input signal). The electrical transmit signals being indicative of the electromagnetic wave propagated by corresponding antennas 66, 68 and 70. Each receiving dipole antenna 78, 80, 82, 90, 92 and 94 includes means for presenting an electrical receive signal (i.e., an output signal). The electrical receiver signals being indicative of the electromagnetic wave received by corresponding antennas 78, 80, 82, 90, 92 and 94. It will be appreciated that these signals are processed in a manner entirely analogous to the prior art with the exception that each of the signals are processed in axially aligned groups, as discussed more fully below.

Each dipole antenna 90, 92 and 94 is disposed in a corresponding pocket cutting 96, 98 and 100. The circumferentially spaced pocket cuttings for each dipole antenna are an important feature of the present invention. The pocket cuttings are much smaller than the groove cuttings of the prior art (i.e., for the circumferentially mounted loop antennas). Therefore, tool 50 is mechanically stronger than the prior art tools. Further, tool 50 can be constructed to have a smaller diameter than was structurely possible with the prior art tools. Dipole antennas 66, 78 and 90 are in axial alignment with each other. Similarly, dipole antennas 68, 80 and 92 are in axial alignment with each other and dipole antennas 70, 82 and 94 are in axial alignment with each other.

The operation of the present invention is similar to that of the prior art described hereinbefore with the exception that data is provided in three segments. Each segment corresponds to each axially aligned group of dipole antennas (e.g., dipole antennas 66, 78 and 90 form one of the three axially aligned groups).

When the data from each segment is taken as a group the amplitude ratio and phase difference responses are very close to that of the circumferentially mounted loop antenna tool of the prior art. While three dipole antennas for each antenna assembly are preferred, any number of dipole antennas may be employed without departing from the spirit and scope of the present invention.

Figure 6:
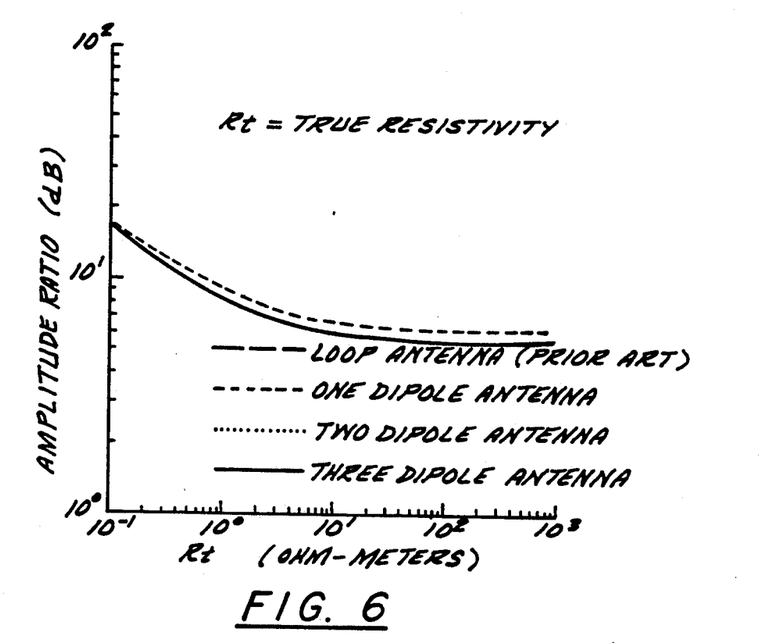
FIG. 6 is a plot of amplitude ratio versus resistivity for a tool in a homogeneous formation in accordance with both the prior art and the various embodiments of the present invention.
Figure 7:
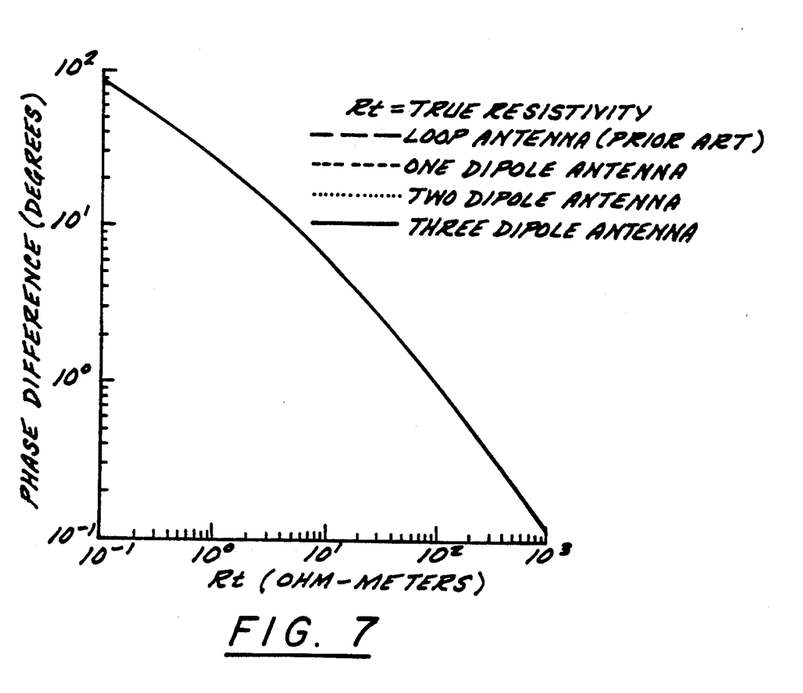
FIG. 7 is a plot of phase difference versus resistivity for a tool in a homogeneous formation in accordance with both the prior art and the various embodiments of the present invention.
Figure 8:
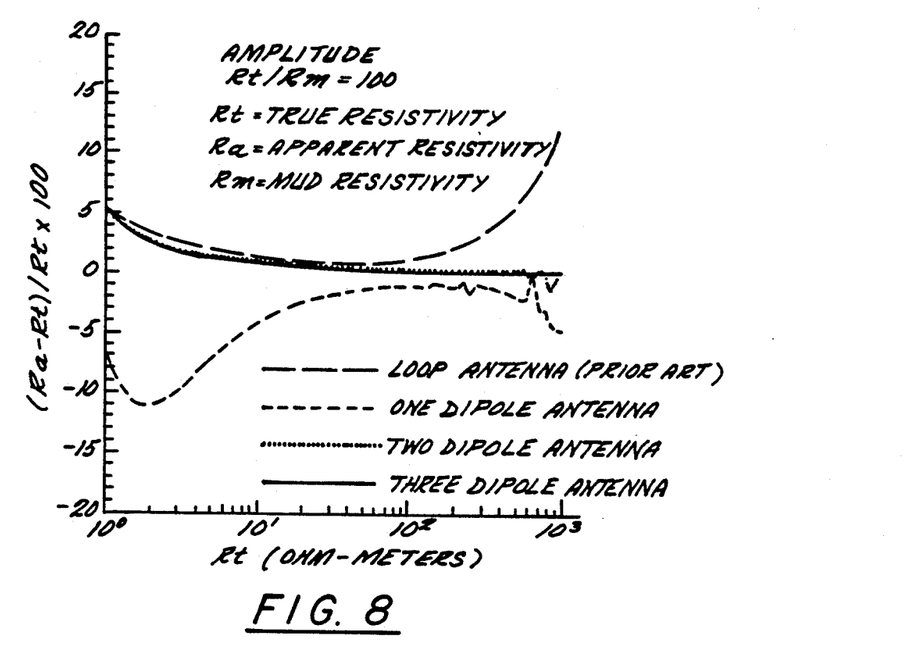
FIG. 8 is a plot of amplitude versus resistivity for a 6 ⅜" tool in a 9⅞' borehole with Rt/Rm=100 in accordance with both the prior art and the various embodiments of the present invention.
Figure 9:
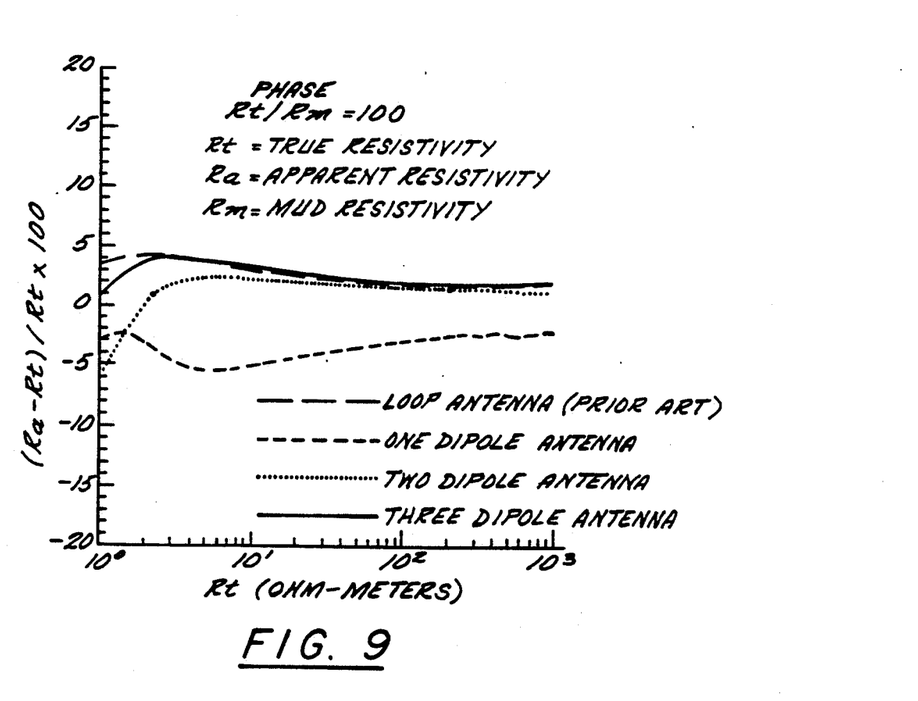
FIG. 9 is a plot of phase difference versus resistivity for a 6¾" tool in a 9⅞" borehole with Rt/Rm=100 in accordance with both the prior art and the various embodiments of the present invention.
Figure 10:
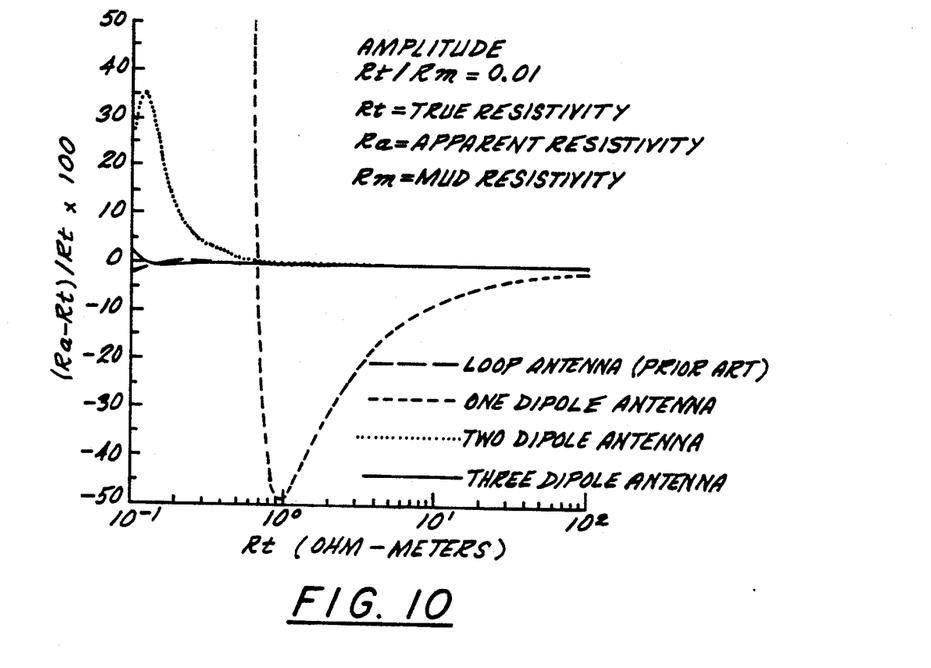
FIG. 10 is a plot of amplitude versus resistivity for a 6 ¾" tool in a 9⅞" borehole with Rt/Rm=0.01 in accordance with both the prior art and the various embodiments of the present invention.
Figure 11:
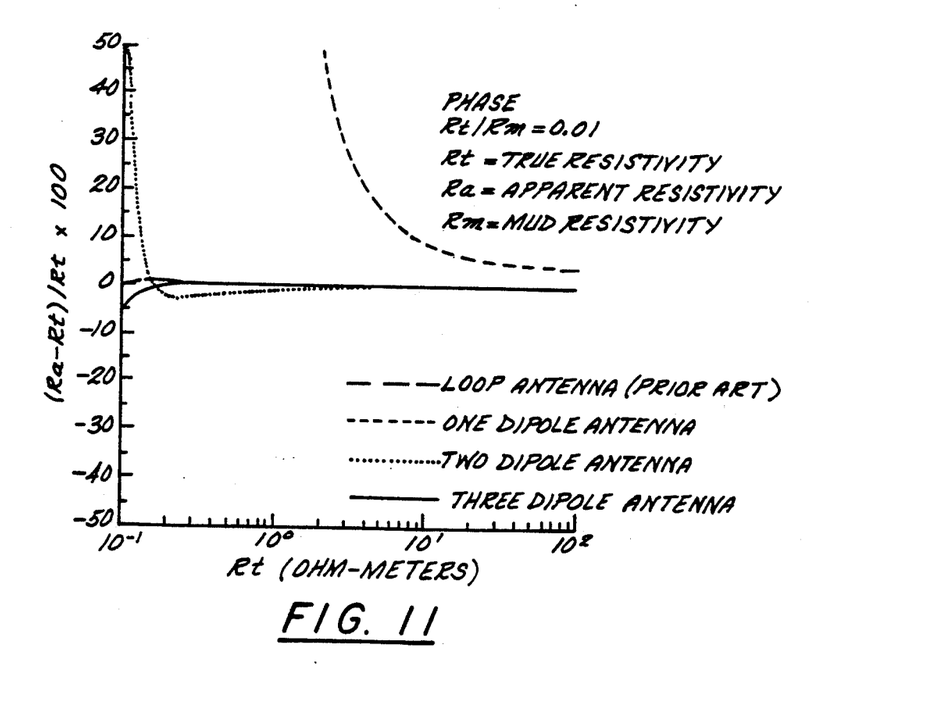
FIG. 11 is a plot of phase difference versus resistivity for a 6¾" tool in a 9⅞" borehole with Rt/Rm=0.01 in accordance with both the prior art and the various embodiments of the present invention.

Referring to FIGS. 6-11, plots of amplitude ratio and phase difference are shown for the tool of the present invention having one, two and three dipole antennas for each antenna assembly and for the tool of the prior art having circumferentially mounted loop antennas. As can be clearly seen from FIGS. 6-11 both the amplitude ratio and phase difference responses of the preferred embodiment of the present invention (i.e., tool 10 having three dipole antennas for each antenna assembly) correspond closely the responses of the prior art tool having circumferentially mounted loop antennas. FIGS. 6 and 7 illustrate the responses of a tool in a homogeneous formation. FIGS. 8 and 9 illustrate the responses of a tool in a borehole with Rt/Rm=100, where Rt is the true resistivity and Rm is the mud resistivity. FIGS. 10 and 11 illustrate the responses of a tool in a borehole with Rt/Rm=0.01.

In the preferred embodiment, with a cylindrically symmetric formation and when tool 50 is centered in borehole 52, the output signals from dipoles 78, 80 and 82 of receiver assembly 58 each have the same voltage level. The same would hold true for dipoles 90, 92 and 94 of receiver assembly 60. Further, the three voltage ratios of the three receiver dipole pairs (i.e., dipole antennas 78 and 90 are a first axially aligned pair, dipole antennas 80 and 92 are a second axially aligned pair and dipole antennas 82 and 94 are a third axially aligned pair) should be same. An imbalance in the output voltage levels of the dipoles or in the three ratios indicates that either the formation is cylindrically asymmetric or tool 50 is not centered in borehole 52 or both. The prior art circumferentially mounted loop antenna tools are azimuthally symmetric with respect to the drill string and the formation (when the tool is at the center of the borehole) and, therefore, can not provide information on azimuthal variations in formation properties.

Figure 12:
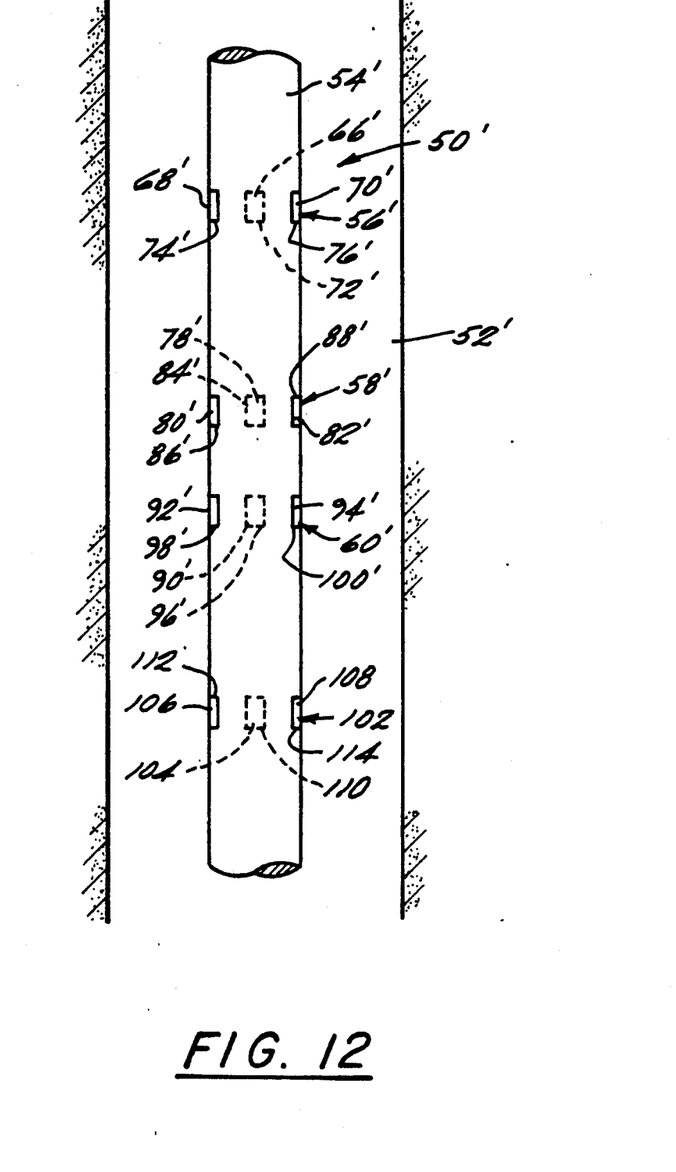
FIG. 12 is a longitudinal view of an electromagnetic propagation tool in accordance with an alternate embodiment of the present invention.

The known concept of compensated formation measurements is also applicable to the present invention. Referring to FIG. wherein like elements to the embodiment of FIG. 4 are numbered alike and included a prime, a compensated dual resistivity sensor in accordance with the present invention is shown generally at 50'. Tool 50' comprises two transmitting antenna assemblies 56' and 102 which are longitudinally spaced apart on tool 50'. Also, a pair of receiving antenna assemblies 58' and 60' are symmetrically spaced longitudinally on tool 50' between transmitting antenna assemblies 56' and 102. In accordance with the known concept of compensated formation measurement each transmitting assembly 56' and 102 is operated alternately. This method of alternate operation compensates for external errors (i.e., formation errors) in the resistivity measurement.

Assemblies 56', 58' and 60' are configured the same as 56, 58 and 60 of the FIG. 4 embodiment, so that only assembly 102 will be described below. Transmitting antenna assembly 102 comprises three circumferentially spaced small current loop dipole antennas 104, 106 and 108 aligned parallel to the centerline of tool 50', wherein each dipole antenna has the characteristics of a point dipole. Each dipole antenna 104, 106, 108 is disposed in a corresponding pocket cutting 110, 112 and 114. Each transmitting dipole antenna 66', 68', 70', 104, 106 and 108 includes means for receiving an electrical transmit signal (i.e., an input signal). The electrical transmit signals being indicative of the electromagnetic wave propagated by corresponding antennas 66', 68', 70', 104, 106 and 108. Each receiving dipole antenna 78', 80', 82', 90', 92' and 94' includes means for presenting an electrical receive signal (i.e., an output signal). The electrical receiver signals being indicative of the electromagnetic wave received by corresponding antennas 78', 80', 82', 90', 92' and 94'. It will be appreciated that these signals are processed in a manner entirely analogous to the prior art with the exception that each of the signals are processed in axially aligned groups.

Dipole antennas 66', 78', 90' and 104 are in axial alignment with each other. Similiarly, dipole antennas 68', 80', 92' and 106 are in axial alignment with each other and dipole antennas 70', 82', 94', and 108 are in axial alignment with each other.

The operation of the present invention is similiar to that of the prior art described hereinbefore with the exception that data is provided in three segments. Each segment corresponds to each axially aligned group of dipole antennas (e.g., dipole antennas 66', 78', 90' and 104 form one of the three axially aligned groups).

Further, any imbalance in the output voltage levels of the dipoles or in the three ratios with respect to the receiver assemblies (e.g., assemblies 58' and 60' described hereinbefore) indicates that either the formation is cylindrically asymmetric or tool 50' is not centered in borehole 52' or both.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. An electromagnetic propagation tool, comprising:
   a drill collar segment;
   transmitter means, said transmitter means being disposed on said drill collar segment, said transmitter means comprising at least one transmitting magnetic dipole antenna for propagating an electromagnetic wave, said transmitting magnetic dipole antenna having characteristics of a point dipole;
   at least one receiver means, said receiver means being disposed on said drill collar segment at an axial distance from said transmitter means, said receiver means comprising at least one receiving magnetic dipole antenna for receiving the electromagnetic wave propagated by said transmitter means, said receiving magnetic dipole antenna having characteristics of a point dipole; and
   wherein said transmitting magnetic dipole antenna and said receiving magnetic dipole antenna are disposed within noncircumferential pockets formed in the outer surface of said drill collar segment.

2. The tool of claim 1 wherein said transmitting dipole antenna is in circumferential alignment with said receiving dipole antenna.

3. The tool of claim 1 wherein said transmitting magnetic dipole antenna and said receiving magnetic dipole antenna each comprise a small current loop.

4. The tool of claim 1 wherein said transmitting magnetic dipole antenna and said receiving magnetic dipole antenna are each aligned parallel to the centerline of the tool.

5. An electromagnetic propagation tool, comprising:
a drill collar segment;
transmitter means, said transmitter means being disposed on said drill collar segment, said transmitter means comprising at least one transmitting magnetic dipole antenna for propagating an electromagnetic wave, said transmitting magnetic dipole antenna having characteristics of a point dipole;
at least one receiver means, said receiver means being disposed on said drill collar segment at an axial distance from said transmitter means, said receiver means comprising at least one receiving magnetic dipole antenna for receiving the electromagnetic wave propagated by said transmitter means, said receiving magnetic dipole antenna having characteristics of a point dipole;
wherein said at least one transmitting magnetic dipole antenna comprises three circumferentially spaced transmitting magnetic dipole antennas, each of said transmitting antennas propagating the corresponding electromagnetic wave and each of said transmitting antennas having characteristics of a point dipole; and
wherein said at least one receiving magnetic dipole antenna comprises three circumferentially spaced receiving magnetic dipole antennas, each of said receiving antennas receiving the electromagnetic wave propagated from said transmitting antennas and each of said receiving antennas having characteristics of a point dipole.

6. The tool of claim 5 wherein each of said three circumferentially spaced transmitting magnetic dipole antennas are in substantial circumferential alignment with a corresponding one of each of said three circumferentially spaced receiving magnetic dipole antennas.

7. The tool of claim 6 wherein each of said receiving magnetic dipole antennas provides an electrical output signal indicative of the corresponding electromagnetic wave received, wherein an imbalance between said output signals is indicative of at least one of cylindrical asymmetry of the formation and a deviation of a drill string from a central borehole position.

8. The tool of claim 5 wherein said transmitting dipole antenna is in circumferential alignment with said receiving dipole antenna.

9. The tool of claim 5 wherein said transmitting magnetic dipole antenna and said receiving magnetic dipole antenna each comprise a small current loop.

10. The too of claim 5 wherein said transmitting magnetic dipole antenna and said receiving magnetic dipole antenna are each aligned parallel to the centerline of the tool.

11. An electromagnetic propagation tool, comprising:
a drill collar segment;
transmitter means, said transmitter means being disposed on said drill collar segment, said transmitter means comprising at least one transmitting magnetic dipole antenna for propagating an electromagnetic wave, said transmitting magnetic dipole antenna having characteristics of a point dipole;
at least one receiver means, said receiver means being disposed on said drill collar segment at an axial distance from said transmitter means, said receiver means comprising at least one receiving magnetic dipole antenna for receiving the electromagnetic wave propagated by said transmitter means, said receiving magnetic dipole antenna having characteristics of a point dipole;
wherein said at least one receiver means comprises two axially spaced apart receiver means, wherein said two receiver means comprises a near receiver means and a far receiver means;
wherein said at least one transmitting magnetic dipole antenna comprises three circumferentially spaced transmitting magnetic dipole antennas, each of said transmitting antennas propagating the corresponding electromagnetic wave and each of said transmitting antennas having characteristics of a point dipole;
wherein said near receiver means comprises three circumferentially spaced near receiving magnetic dipole antennas, each of said near receiving antennas receiving the electromagnetic wave propagated from said transmitting antenna and each of said near receiving antennas having characteristics of a point dipole; and
wherein said far receiver means comprises three circumferentially spaced far receiving magnetic dipole antennas, each of said far receiving antennas receiving the electromagnetic wave propagated from said transmitting dipole antennas and each of said far receiving antennas having characteristics of a point dipole.

12. The tool of claim 11 wherein each of said three circumferentially spaced transmitting magnetic dipole antennas are in substantial axial alignment with a corresponding one of each of said three circumferentially spaced near receiving magnetic dipole antennas and with a corresponding one of each of said three circumferentially spaced far receiving magnetic dipole antennas.

13. The tool of claim 11 wherein each of said near receiving magnetic dipole antennas provides a first electrical output signal indicative of the electromagnetic wave received;
wherein each of said far receiving magnetic dipole antennas provides a second electrical output signal indicative of the electromagnetic wave received; and
wherein an imbalance between corresponding ratios of said first and second output signals is indicative of at least one of cylindrical asymmetry of the formation and a deviation of a drillstring from a central borehole position.

14. The tool of claim 11 wherein the axial distance between said transmitter means and said near receiver means is greater than the axial distance between said near receiver means and said far receiver means.

15. The tool of claim 11 wherein said transmitting dipole antenna is in circumferential alignment with said receiving dipole antenna.

16. The tool of claim 11 wherein said transmitting magnetic dipole antenna and said receiving magnetic dipole antenna each comprise a small current loop.

17. The tool of claim 11 wherein said transmitting magnetic dipole antenna and said receiving magnetic dipole antenna are each aligned parallel to the centerline of the tool.

18. An electromagnetic propagation tool, comprising:
a drill collar segment;
three transmitting magnetic dipole antennas circumferentially spaced about said drill collar segment, each of said transmitting magnetic dipole antennas propagating an electromagnetic wave in response to a first electrical signal, each of said transmitting magnetic dipole antennas having the characteristics of a point dipole;

three near receiving magnetic dipole antennas circumferentially spaced about said drill collar segment at a first axial distance from said transmitting magnetic dipole antennas, each of said near receiving magnetic dipole antennas being in substantial axial alignment with a corresponding one of each of said transmitting magnetic dipole antennas, each of said near receiving magnetic dipole antennas receiving the electromagnetic wave propagation from said transmitting magnetic dipole antennas and providing a second electrical signal indicative of the electromagnetic wave received, each of said near receiving magnetic dipole antennas having characteristics of a point dipole; and three far receiving magnetic dipole antennas circumferentially spaced about said drill collar segment at a second axial distance from said near receiving magnetic dipole antennas, said second axial distance being greater than said first axial distance, each of said far receiving magnetic dipole antennas being in substantial circumferential alignment with a corresponding one of each of said transmitting magnetic dipole antennas, each of said far receiving magnetic dipole antennas receiving the electromagnetic wave propagated from said transmitting magnetic dipole antennas and providing a third electrical signal indicative of the electromagnetic wave received, each of said far receiving magnetic dipole antennas having characteristics of a point dipole.

19. The tool of claim 18 wherein said transmitting magnetic dipole antennas, said near receiving magnetic dipole antennas and said far receiving magnetic dipole antennas are disposed within pockets formed in the outer surface of said drill collar segment.

20. The tool of claim 18 wherein said transmitting magnetic dipole antennas, said near receiving magnetic dipole antennas and said far receiving magnetic dipole antennas each comprise a small current loop.

21. The tool of claim 18 wherein said transmitting magnetic dipole antennas, said near receiving magnetic dipole antennas and said far receiving magnetic dipole antennas are each aligned parallel to the centerline of the tool.

22. An electromagnetic propagation tool, comprising:
a drill collar segment;
first and second transmitter means, said first and second transmitter means being disposed on said drill collar segment wherein said first transmitter means is longitudinally spaced apart from said second transmitter means on said drill collar segment, each of said first and second transmitter means comprising at least one transmitting magnetic dipole antenna having characteristics of a point dipole, said transmitting magnetic dipole antennas for propagating an electromagnetic wave; and
at least one receiver means, said receiver means being disposed on said drill collar segment wherein said receiver means is symmetrically spaced longitudinally between said first and second transmitter means on said drill collar segment, said receiver means comprising at least one receiving magnetic dipole antenna having characteristics of a point dipole, said receiving magnetic dipole antenna for receiving the electromagnetic wave propagated by said first and second transmitter means.

23. The tool of claim 22 wherein said transmitting magnetic dipole antennas and said receiving magnetic dipole antenna are disposed within pockets formed in the outer surface of said drill collar segment.

24. The tool of claim 22 wherein said at least one transmitting magnetic dipole antenna for each of said first and second transmitter means comprises three circumferentially spaced transmitting magnetic dipole antennas, each of said transmitting antennas propagating the corresponding electromagnetic wave, each of said transmitting antennas having characteristics of a point dipole; and wherein said at least one receiving magnetic dipole antenna comprises three circumferentially spaced receiving magnetic dipole antennas, each of said receiving antennas receiving the electromagnetic wave propagated from said transmitting antennas, each of said receiving antennas having characteristics of a point dipole.

25. The tool of claim 24 wherein each of said three circumferentially spaced transmitting magnetic dipole antennas of said first transmitter means are in substantial circumferential alignment with a corresponding one of each of said three circumferentially spaced receiving magnetic dipole antennas and with a corresponding one of each of said three circumferentially spaced transmitting magnetic dipole antennas of said second transmitter means.

26. The tool of claim 25 wherein each of said receiving magnetic dipole antennas provides an electrical output signal indicative of the corresponding electromagnetic wave received, wherein an imbalance between said output signals is indicative of at least one of cylindrical asymmetry of the formation and a deviation of a drill string from a central borehole position.

27. The tool of claim 22 wherein said at least one receiver means comprises first and second axially spaced apart receiver means.

28. The tool of claim 27 wherein said first transmitter means comprises three circumferentially spaced first transmitting magnetic dipole antennas, each of said first transmitting antennas propagating the corresponding electromagnetic wave and each of said first transmitting antennas having characteristics of a point dipole;

wherein said second transmitter means comprises three circumferentially spaced second transmitting magnetic dipole antennas, each of said second transmitting antennas propagating the corresponding electromagnetic wave and each of said second transmitting antennas having characteristics of a point dipole;

wherein said first receiver means comprises three circumferentially spaced first receiving magnetic dipole antennas, each of said first receiving antennas receiving the electromagnetic wave propagated from said first and second transmitting antennas, each of said first receiving antennas having characteristics of a point dipole; and wherein said second receiver means comprises three circumferentially spaced second receiving magnetic dipole antennas, each of said second receiving antennas receiving the electromagnetic wave propagated from said first and second transmitting dipole antennas, each of said far receiving antennas having characteristics of a point dipole.

29. The tool of claim 28 wherein each of said three circumferentially spaced first transmitting magnetic dipole antennas are in substantial axial alignment with a corresponding one of each of said three circumferentially spaced first receiving magnetic dipole antennas, with a corresponding one of each of said three circumferentially spaced second receiving magnetic dipole antennas and with a correspond one of each of said three circumferentially spaced second transmitting magnetic dipole antennas.

30. The tool of claim 28 wherein each of said first receiving magnetic dipole antennas provides a first electrical output signal indicative of the electromagnetic wave received;
   wherein each of said second receiving magnetic dipole antennas provides a second electrical output signal indicative of the electromagnetic wave receive; and
   wherein an imbalance between corresponding ratios of said first and second output signals is indicative of at least one of cylindrical asymmetry of the formation and a deviation of a drillstring from a central borehole position.

31. The tool of claim 22 wherein said first and second transmitting magnetic dipole antennas are in circumferential alignment with each other and with said receiving magnetic dipole antenna.

32. The tool of claim 22 wherein said transmitting magnetic dipole antennas and said receiving magnetic dipole antenna each comprise a small current loop.

33. The tool of claim 22 wherein said transmitting magnetic dipole antennas and said receiving magnetic dipole antenna are each aligned parallel to the centerline of the tool.

34. An electromagnetic propagation tool, comprising:
   a drill collar segment;
   three first transmitting magnetic dipole antennas circumferentially spaced about said drill collar segment, each of said first transmitting magnetic dipole antennas propagating an electromagnetic wave in response to a first electrical signal, each of said first transmitting magnetic dipole antennas having the characteristics of a point dipole;
   three second transmitting magnetic dipole antennas circumferentially spaced about said drill collar segment, each of said second transmitting magnetic dipole antennas propagating an electromagnetic wave in response to a second electrical signal, each of said second transmitting magnetic dipole antennas having the characteristics of a point dipole, said second transmitting magnetic dipole antennas being longitudinally spaced apart from said first transmitting magnetic dipole antennas, each of said second transmitting magnetic dipole antennas being in substantial axial alignment with a corresponding one of each of said first transmitter magnetic dipole antennas;
   three first receiving magnetic dipole antennas circumferentially spaced about said drill collar segment, each of said first receiving magnetic dipole antennas being in substantial axial alignment with a corresponding one of each of said first transmitting magnetic dipole antennas, each of said first receiving magnetic dipole antennas receiving the electromagnetic wave propagated from said first and second transmitting magnetic dipole antennas and providing a third electrical signal indicative of the electromagnetic wave received, each of said first receiving magnetic dipole antennas having characteristics of a point dipole; and
   three second receiving magnetic dipole antennas circumferentially spaced about said drill collar segment, said second receiving magnetic dipole antennas being longitudinally spaced from said first receiving magnetic dipole antennas and said first and second receiving magnetic dipole antennas together being symmetrically spaced longitudinally between said first and second transmitting magnetic dipole antennas, each of said second receiving magnetic dipole antennas being in substantial circumferential alignment with a corresponding one of each of said first transmitting magnetic dipole antennas, each of said second receiving magnetic dipole antennas receiving the electromagnetic wave propagated from said first and second transmitting magnetic dipole antennas and providing a fourth electrical signal indicative of the electromagnetic wave received, each of said second receiving magnetic dipole antennas having characteristics of a point dipole.

35. The tool of claim 34 wherein said first and second transmitting magnetic dipole antennas and said first and second receiving magnetic dipole antennas are disposed within pockets formed in the outer surface of said drill collar segment.

36. The tool of claim 34 wherein said first and second transmitting magnetic dipole antennas and said first and second receiving magnetic dipole antennas each comprise a small current loop.

37. The tool of claim 34 wherein said first and second transmitting magnetic dipole antennas and said first and second receiving magnetic dipole antennas are each aligned parallel to the centerline of the tool.

38. An electromagnetic propagation tool, comprising:
   a drill collar segment;
   at least one first noncircumferential pocket formed in the outer surface of said drill collar segment;
   transmitter means comprising at least one transmitting magnetic dipole antenna disposed in a corresponding said at least one first pocket, said transmitting magnetic dipole antenna for propagating an electromagnetic wave;
   at least one second noncircumferential pocket formed in the outer surface of said drill collar segment at axial distance from said first pocket; and
   at least one receiver means comprising at least one receiving magnetic dipole antenna disposed in a corresponding said at least one second pocket, said receiving magnetic dipole antenna for receiving the electromagnetic wave propagated by said transmitter means.

39. The tool of claim 38:
   wherein said at least one first pocket comprises three circumferentially spaced first pockets;
   wherein said at least one transmitting magnetic dipole antenna comprises three transmitting magnetic dipole antennas each disposed in a corresponding one of said first pockets, each of said transmitting antennas propagating the corresponding electromagnetic wave;
   wherein said at least one second pocket comprises three circumferentially spaced second pockets; and
   wherein said at least one receiving magnetic dipole antenna comprises three receiving magnetic dipole antennas each disposed in a corresponding one of said second pockets, each of said receiving antennas receiving the electromagnetic wave propagated from said transmitting antennas.

40. The tool of claim 39 wherein each of said three circumferentially spaced transmitting first pockets are in substantial circumferential alignment with a corresponding one of each of said three circumferentially spaced second pockets.

41. The tool of claim 40 wherein each of said receiving magnetic dipole antennas provides an electrical output signal indicative of the corresponding electromagnetic wave received, wherein an imbalance between said output signals is indicative of at least one of cylindrical asymmetry of the formation and a deviation of a drill string from a central borehole position.

42. The tool of claim 38 wherein said at least one receiver means comprises a near receiver means and a far receiver means.

43. The tool of claim 42:
wherein said at least one first pocket comprises three circumferentially spaced first pockets;
wherein said at least one transmitting dipole antenna comprises three transmitting magnetic dipole antennas each disposed in a corresponding one of said first pockets, each of said transmitting antennas propagating the corresponding electromagnetic wave;
wherein said at least one second pocket comprise a first group of three circumferentially spaced second pockets and a second group of three circumferentially spaced second pocket, said second group of second pockets being axially spaced apart from said first group of second pockets;
wherein said near receiver means comprises three near receiving magnetic dipole antenna each disposed in a corresponding one of said second pockets in said first group, each of said near receiving antennas receiving the electromagnetic wave propagated from said transmitting antennas; and
wherein said far receiver means comprises three far receiving magnetic dipole antennas each disposed in a corresponding one of said second pockets in said second group, each of said far receiving antennas receiving the electromagnetic wave propagated from said transmitting antennas.

44. The tool of claim 43 wherein each of said three circumferentially spaced first pockets are in substantial axial alignment with a corresponding one of each of said three circumferentially spaced second pockets in said first group and with a corresponding one of each of said three circumstantially spaced second pockets in said second group.

45. The tool of claim 44 wherein each of said near receiving magnetic dipole antennas provides a first electrical output signal indicative of the electromagnetic wave receiver;
wherein each of said far receiving magnetic dipole antennas provides a second electrical output signal indicative of the electromagnetic wave received; and
wherein an imbalance between corresponding ratios of said first and second output signals is indicative of at least one of cylindrical asymmetry of the formation and a deviation of a drillstring from a central borehole position.

46. The tool of claim 43 wherein the axial distance between said first pockets and said second pockets in said first group is greater than the axial distance between said second pocket in said first group and said second pockets in said second group.

47. The tool of claim 38 wherein said transmitting dipole antenna is in circumferential alignment with said receiving dipole antenna.

48. The tool of claim 38 wherein said transmitting magnetic dipole antenna and said receiving magnetic dipole antenna each comprise a small current loop.

49. The tool of claim 38 wherein said transmitting magnetic dipole antenna and said receiving magnetic dipole antenna are each aligned parallel to the centerline of the tool.

* * * * *